(12) United States Patent
Bookbinder et al.

(10) Patent No.: US 10,228,509 B2
(45) Date of Patent: *Mar. 12, 2019

(54) LOW ATTENUATION FIBER WITH VISCOSITY MATCHED CORE AND INNER CLAD

(71) Applicant: Corning Incorporated, Corning, NY (US)

(72) Inventors: Dana Craig Bookbinder, Corning, NY (US); Ming-Jun Li, Horseheads, NY (US); Hazel Benton Matthews, III, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,619

(22) Filed: Apr. 12, 2017

(65) Prior Publication Data

US 2017/0219770 A1 Aug. 3, 2017

Related U.S. Application Data

(62) Division of application No. 14/728,132, filed on Jun. 2, 2015, now Pat. No. 9,658,394.

(Continued)

(51) Int. Cl.
*G02B 6/036* (2006.01)
*G02B 6/02* (2006.01)
(Continued)

(52) U.S. Cl.
CPC .......... *G02B 6/03627* (2013.01); *C03B 37/02* (2013.01); *C03B 37/027* (2013.01);
(Continued)

(58) Field of Classification Search
None
See application file for complete search history.

(56) References Cited

U.S. PATENT DOCUMENTS 4,339,173 A 7/1982 Aggarwal et al.
4,715,679 A 12/1987 Bhagavatula
(Continued)

FOREIGN PATENT DOCUMENTS

EP 1209495 A2 7/2001
EP 1191367 A2 8/2001
(Continued)

OTHER PUBLICATIONS

International Search Report and Written Opinion PCT/US2015/036930 dated Oct. 28, 2015.
(Continued)

*Primary Examiner* — Chad H Smith
(74) *Attorney, Agent, or Firm* — Smit Kapadia; Svetlana Z. Short

(57) ABSTRACT

A single mode optical fiber having a core made from silica and less than or equal to about 6.5 weight % germania and having a maximum relative refractive index $\Delta_{1MAX}$. The optical fiber also has an inner cladding surrounding the core and having a minimum relative refractive index $\Delta_{2MIN}$. A difference between a softening point of the core and a softening point of the inner cladding is less than or equal to about 20° C., and $\Delta_{1MAX} > \Delta_{2MIN}$. The single mode optical fiber may also have an outer cladding surrounding the inner cladding made from silica or SiON. The outer cladding has a maximum relative refractive index $\Delta_{3MAX}$, and $\Delta_{3MAX} > \Delta_{2MIN}$. A method for manufacturing an optical fiber includes providing a preform to a first furnace, the preform, drawing the optical fiber from the preform, and cooling the drawn optical fiber in a second furnace.

11 Claims, 5 Drawing Sheets

Related U.S. Application Data

(60) Provisional application No. 62/016,192, filed on Jun. 24, 2014.

(51) Int. Cl.
*C03B 37/027* (2006.01)
*C03B 37/02* (2006.01)
*C03C 3/06* (2006.01)
*C03C 13/04* (2006.01)

(52) U.S. Cl.
CPC .. *C03B 37/02718* (2013.01); *C03B 37/02727* (2013.01); *C03C 3/06* (2013.01); *C03C 13/045* (2013.01); *C03C 13/046* (2013.01); *G02B 6/02014* (2013.01); *C03B 2201/12* (2013.01); *C03B 2201/20* (2013.01); *C03B 2201/31* (2013.01); *C03B 2203/223* (2013.01); *C03B 2203/23* (2013.01); *C03B 2203/24* (2013.01); *C03B 2205/55* (2013.01); *C03B 2205/56* (2013.01); *C03C 2201/12* (2013.01); *C03C 2201/31* (2013.01); *C03C 2213/00* (2013.01)

(56) References Cited

U.S. PATENT DOCUMENTS

| | | |
|---|---|---|
| 5,090,979 A | 2/1992 | Le Sergent |
| 5,522,003 A | 5/1996 | Ward |
| 6,917,740 B2 | 7/2005 | Boek et al. |
| 7,076,139 B1 | 7/2006 | Aikawa et al. |
| 7,593,612 B2 | 9/2009 | Shimotakahara |
| 7,606,460 B2 | 10/2009 | Shoichiro |
| 8,849,082 B2 | 9/2014 | Bookbinder et al. |
| 8,891,925 B2 | 11/2014 | Bickham et al. |
| 9,020,316 B2 | 4/2015 | Bookbinder et al. |
| 9,658,394 B2 * | 5/2017 | Bookbinder ............ C03B 37/02 |
| 2005/0274151 A1 | 12/2005 | Moridaira et al. |
| 2006/0101861 A1 | 5/2006 | Nagayama et al. |
| 2007/0189699 A1 | 8/2007 | Matsuo et al. |
| 2011/0211797 A1 | 9/2011 | Bennett et al. |
| 2011/0268399 A1 | 11/2011 | Berkey et al. |
| 2013/0044987 A1 | 2/2013 | Bickham et al. |
| 2014/0241684 A1 | 8/2014 | Bookbinder et al. |

FOREIGN PATENT DOCUMENTS

| | | |
|---|---|---|
| EP | 2749917 A2 | 12/2013 |
| GB | 1191367 | 8/1968 |
| JP | 04362603 A | 12/1992 |

OTHER PUBLICATIONS

English Translation of CN201580034235.5 First Office Action dated Nov. 9, 2018, China Patent Office, 11 Pgs.

* cited by examiner

LOW ATTENUATION FIBER WITH VISCOSITY MATCHED CORE AND INNER CLAD

CROSS-REFERENCE TO RELATED APPLICATION

This is a divisional application of U.S. application Ser. No. 14/728,132 filed on Jun. 2, 2015 which claims the benefit of U.S. Provisional Application Ser. No. 62/016,192 filed on Jun. 24, 2014, the contents of which are relied upon and incorporated herein by reference in their entirety, and benefit of priority under § 120 is hereby claimed.

BACKGROUND

Field

The present disclosure relates generally to optical fibers, and particularly to low attenuation optical fibers.

Technical Background

Glass optical fibers with low attenuation have recently been of significant interest in the telecommunications field. Techniques for improving attenuation properties can play important roles in many types of fibers, including transmission fibers used in long distance applications, multimode fibers used in the emerging area of fiber to the home applications, and dispersion compensation fibers where bending loss has limited many designs from practical use. In certain applications such as long distance applications, low attenuation is desired to deliver data accurately via light signals. Many of the proposed solutions for this problem involve significant modification of the fiber and its refractive index profile.

SUMMARY

According to one or more embodiments shown and described herein a single mode optical fiber has a core made from silica and less than or equal to about 6.5 weight % germania and has a maximum relative refractive index $\Delta_{1MAX}$. The optical fiber also has an inner cladding surrounding the core and having a minimum relative refractive index $\Delta_{2MIN}$. A difference between a softening point of the core and a softening point of the inner cladding is less than or equal to about 20° C., and $\Delta_{1MAX} > \Delta_{2MIN}$.

According to some embodiments shown and described herein, the single mode optical fiber may also have an outer cladding surrounding the inner cladding made from silica or SiON. The outer cladding has a maximum relative refractive index $\Delta_{3MAX}$, and $\Delta_{3MAX} > \Delta_{2MIN}$.

According to embodiments shown and described herein a method of manufacturing a single mode optical fiber includes providing a preform to a first furnace, the preform having a core comprising silica and less than or equal to about 6.5 weight % germania, and an inner cladding that surrounds the core; drawing the optical fiber from the preform, and cooling the drawn optical fiber in a second furnace, wherein a difference between a softening point of the core and a softening point of the inner cladding is less than or equal to about 50° C.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

DETAILED DESCRIPTION

Figure 1A:
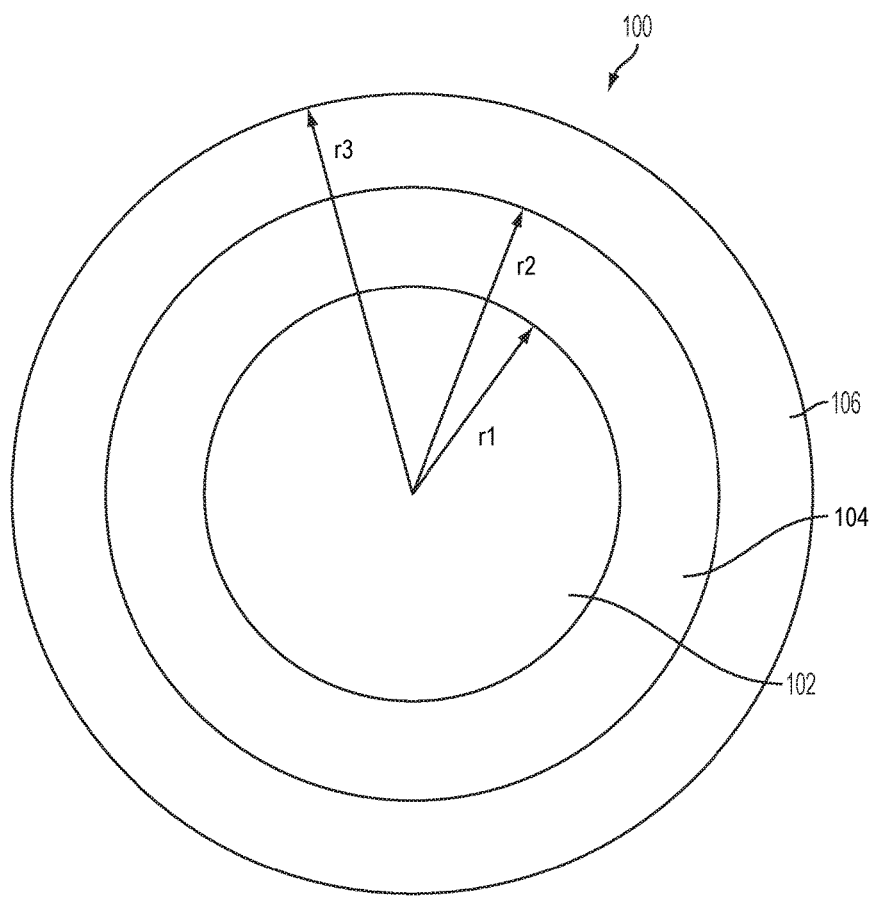
FIG. 1A is a schematic cross sectional view of an optical fiber according to one or more embodiments shown and described herein.
Figure 1B:
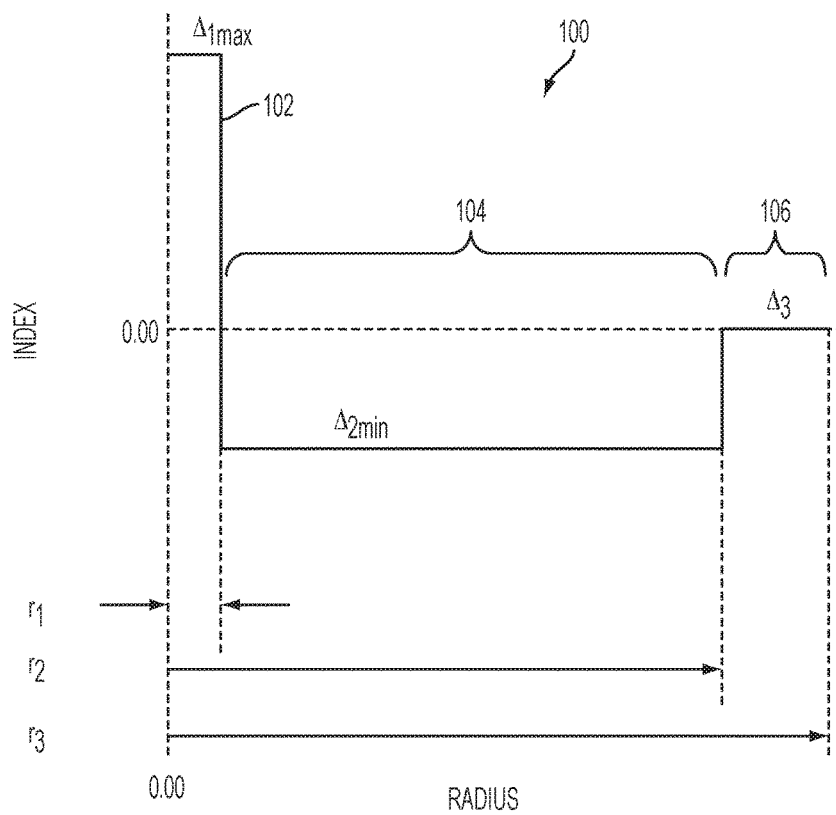
FIG. 1B graphically depicts index versus radius of an optical fiber depicted in FIG. 1A.

FIG. 1A schematically depicts a cross section of an optical fiber 100 according to one or more embodiments shown and described herein. Embodiments of optical fibers 100 described herein generally comprise a single mode optical fiber having a core 102 made from silica and less than or equal to about 6.5 weight % germania. FIG. 1B graphically depicts an index profile versus radius of the fiber 100 depicted in FIG. 1A. The core 102 has a maximum relative refractive index $\Delta_{1MAX}$. The optical fiber 100 also has an inner cladding 104 surrounding the core 102 and having a minimum relative refractive index $\Delta_{2MIN}$. A difference between a softening point of the core 102 and a softening point of the inner cladding 104 is less than or equal to about 20° C., and $\Delta_{1MAX} > \Delta_{2MIN}$. In some embodiments, the optical fiber 100 also has an outer cladding 106 surrounding the inner cladding 104.

The "refractive index profile," as used herein, is the relationship between refractive index or relative refractive index and fiber radius of a radial cross section of the optical fiber.

"Relative refractive index," as used herein, is defined as:

$$\Delta_i \% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass. The terms delta, delta index, delta index percent, Δ, Δ% are used interchangeably herein.

More specifically, as used herein, $\Delta_{1MAX}$ refers to the maximum relative refractive index of a core of the optical fiber, $\Delta_{2MIN}$ refers to the minimum relative refractive index of an inner cladding of the optical fiber and $\Delta_{3MAX}$ refers to the maximum relative refractive index of an outer cladding of the optical fiber. The relative refractive indexes are given in percentages based from the refractive index of pure silica glass.

It should be understood that the phrase "pure silica glass," as used herein, means that the region or layer of the optical fiber comprising "pure silica glass" does not contain material, such as dopants and/or other trace materials, in an amount which would significantly alter the refractive index of the silica glass region or portion. However, small amounts of dopants (e.g., chlorine and/or fluorine in an amount less than 1500 ppm of each) may be present in the region or portion that is otherwise "pure silica."

"Chromatic dispersion" (which may be referred to herein as "dispersion" unless otherwise noted) of a waveguide fiber is the sum of the material dispersion and the waveguide dispersion. A zero dispersion wavelength is a wavelength at which the dispersion has a value of zero and also referred to herein as Lambda 0 or $\lambda_0$. Dispersion slope is the rate of change of dispersion with respect to wavelength.

"Effective area" is defined in equation 1 as:

$$A_{eff}=2\pi(\int f^2 \, r \, dr)^2/(\int f^4 \, r \, dr) \quad \text{(Eq. 1)}$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" (also referred to herein as alpha profile or just alpha) refers to a relative refractive index profile of the core region expressed in terms of $\Delta(r)$ which is in units of "%", where r is radius. $\Delta r$ is represented by equation 2, $$\Delta(r)=\Delta(r_o)(1-[|r-r_o|/(r_1-r_o)]^\alpha) \quad \text{(Eq. 2)}$$

where $r_o$ is the point at which $\Delta(r)$ is maximum, $r_1$ is the point at which $\Delta(r)$ is zero, and r is in the range $r_i < r < r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method as shown in equations 3 and 4, respectively wherein, $$2w=MFD \quad \text{(Eq. 3)}$$

and $$w^2=(2\int f^2 \, r \, dr/\int [df/dr]^2 \, r \, dr) \quad \text{(Eq. 4)}$$

wherein the integral limits are 0 to ∞.

The bend resistance of a waveguide fiber can be gauged by induced attenuation under prescribed test conditions, such as by deploying or wrapping the fiber around a mandrel having a prescribed diameter, e.g., by wrapping 1 turn around either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

One type of bend test is the lateral load microbend test. In a so-called "lateral load wire mesh" test (LLWM), a prescribed length of waveguide fiber is placed between two flat plates. A #70 wire mesh is attached to one of the plates. A known length of waveguide fiber is sandwiched between the plates, and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. In embodiments, the pin array is a set of ten cylindrical pins arranged in a single row and held in a fixed vertical position on a flat surface. The pin spacing is 5 mm, center to center, and the pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, "theoretical fiber cutoff", or "theoretical cutoff" for a given mode is the wavelength above which guided light cannot propagate in that mode. A mathematical definition can be found in "Single Mode Fiber Optics," Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength," also known as the "2 m fiber cutoff" or "measured cutoff." The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

Referring to FIGS. 1A and 1B, a cross section of an optical fiber 100 is shown according to embodiments described herein. The optical fiber 100 generally comprises a glass core 102 with an inner cladding 104 surrounding the core 102. In some embodiments, an outer cladding 106 may surround the inner cladding 104. The core 102, the inner cladding 104, and the outer cladding 106 may comprise silica, specifically silica-based glass. The core 102 and the inner cladding 104 may comprise dopants, as described in more detail herein. The cross section of the optical fiber 100 may be generally circular-symmetric with respect to the center of the core 102 and the core 102 may have a radius $r_1$. The inner cladding 104 surrounds the core 102 and extends from the radius $r_1$ to the radius $r_2$ such that the inner cladding has a radial thickness $T_2=r_2-r_1$. The outer cladding 106 surrounds the inner cladding 104 and extends from the radius $r_2$ to the radius $r_3$ such that the outer cladding has a radial thickness $T_3=r_3-r_2$. Accordingly, the optical fiber 100 (e.g., the core 102, inner cladding 104 and outer cladding 106) may have an outer diameter $2r_3$.

As described herein, the core 102 of the optical fiber 100 has a radius $r_1$ and a radial thickness $T_1=r_1$. In embodiments, the optical fiber 100 may be a single-mode optical fiber. The core may have a radial thickness of greater than or equal to about 3.0 microns, such as greater than or equal to about 4.0 microns. The core may have a radial thickness less than or equal to about 7.0 microns, such as less than or equal to about 6.0 microns. Accordingly, in some embodiments, the radial thickness $T_1$ may be from greater than or equal to about 3.0 microns to less than or equal to about 7.0 microns, such as from greater than or equal to about 4.0 microns to less than or equal to about 6.0 microns. In other embodiments, the radial thickness $T_1$ may be about 5.0 microns. However, it should be understood that the core 102 may have different dimensions to facilitate various other single-mode embodiments.

In embodiments, the core 102 comprises silica glass ($SiO_2$) and one or more index of refraction raising dopants (referred to hereinafter as "up dopants") such as, for example, $GeO_2$, $Al_2O_3$, $P_2O_5$, $TiO_2$, $ZrO_2$, $Nb_2O_5$ and/or $Ta_2O_5$. Without being bound to any particular theory, it is believed that dopants, such as $GeO_2$, in the core 102 of the optical fiber 100 cause Rayleigh scattering of light conducted within the core 102 of the optical fiber 100, causing attenuation along the length of the optical fiber. Optical fibers having higher concentrations of dopants will generally have more Rayleigh scattering, which leads to increased attenuation. Accordingly, embodiments of the optical fiber described herein have low core dopant concentrations, which improve the attenuation properties of the optical fiber.

In some embodiments, the core 102 is up-doped with $GeO_2$. For example, the core 102 may be up-doped with less than or equal to about 6.5 weight % $GeO_2$, such as less than or equal to about 6.0 weight % $GeO_2$. The core 102 may be up-doped with less than or equal to about 5.5 weight % $GeO_2$, such as less than or equal to about 5.0 weight % $GeO_2$. In embodiments, the core 102 may be up-doped with greater than or equal to about 2.0 weight % $GeO_2$, such as greater than or equal to about 2.5 weight % $GeO_2$. In embodiments, the core 102 may be up-doped with greater than or equal to about 3.0 weight % $GeO_2$, such as greater than or equal to about 3.5 weight % $GeO_2$. Accordingly, in embodiments, the core 102 may comprise from greater than or equal to about 2.0 weight % to less than or equal to about 6.5 weight % $GeO_2$, or from greater than or equal to about 2.5 weight % to less than or equal to about 6.0 weight % $GeO_2$. The core 102 may comprise from greater than or equal to about 3.0 weight % to less than or equal to about 5.5 weight % $GeO_2$, or from greater than or equal to about 3.5 weight % to less than or equal to about 5.0 weight % $GeO_2$.

In embodiments where the core 102 is up-doped, the maximum relative refractive index $\Delta_{1MAX}$ of the core 102 may be greater than or equal to about 0.13%, such as greater than or equal to about 0.15%. In embodiments, the maximum relative refractive index $\Delta_{1MAX}$ may be greater than or equal to about 0.20%, such as greater than or equal to about 0.23%. The maximum relative refractive index $\Delta_{1MAX}$ may be less than or equal to about 0.37%, such as less than or equal to about 0.35%. In embodiments, the maximum relative refractive index $\Delta_{1MAX}$ may be less than or equal to about 0.30%, such as less than or equal to about 0.27%. Accordingly, in embodiments, the maximum relative refractive index $\Delta_{1MAX}$ may be from greater than or equal to about 0.13% to less than or equal to about 0.37%, such as from greater than or equal to about 0.15% to less than or equal to about 0.35. The maximum relative refractive index $\Delta_{1MAX}$ of the core 102 may be from greater than or equal to about 0.20% to less than or equal to about 0.30%, such as from greater than or equal to about 0.23% to less than or equal to about 0.27%.

As described herein above, the optical fiber 100 may further comprise an inner cladding 104. In embodiments, the inner cladding 104 has a radial thickness $T_2 = r_2 - r_1$. The radial thickness $T_2$ of the inner cladding 104 may depend on the desired dimensions of the core 102 and the desired dimensions and properties of the glass portion of the optical fiber 100. In embodiments, the inner cladding may have a radial thickness of greater than or equal to about 12.0 microns, such as greater than or equal to about 25.0 microns. The inner cladding may have a radial thickness of greater than or equal to about 30.0 microns, such as greater than or equal to about 35.0 microns. The inner cladding may have a radial thickness of less than or equal to about 55.0 microns. Accordingly, in embodiments, the inner cladding may have a radial thickness from greater than or equal to about 12.0 microns to less than or equal to about 55.0 microns, such as from greater than or equal to about 25.0 microns to less than or equal to about 55.0 microns. The inner cladding may have a radial thickness from greater than or equal to about 30.0 microns to less than or equal to about 55.0 microns, such as from greater than or equal to about 35.0 microns to less than or equal to about 55.0 microns.

In embodiments, the inner cladding may comprise silica-based glass and dopants that decrease the refractive index of the inner cladding (hereinafter referred to as "down dopants"), such as fluorine. The inner cladding may be down-doped with greater than or equal to about 0.10 weight % fluorine, such as greater than or equal to about 0.12 weight % fluorine. In embodiments, the inner cladding may be down-doped with greater than or equal to about 0.20 weight % fluorine, such as greater than or equal to about 0.30 weight % fluorine. The inner cladding may be down-doped with less than or equal to about 0.65 weight % fluorine, such as less than or equal to about 0.50 weight % fluorine. In embodiments, the inner cladding may be down-doped with less than or equal to about 0.45 weight % fluorine, such as less than or equal to about 0.40 weight % fluorine. Accordingly, in embodiments, the inner cladding may be down-doped with from greater than or equal to about 0.10 weight % fluorine to less than or equal to about 0.65 weight % fluorine, such as from greater than or equal to about 0.12 weight % fluorine to less than or equal to about 0.50 weight % fluorine. The inner cladding may be down-doped with from greater than or equal to about 0.20 weight % fluorine to less than or equal to about 0.45 weight % fluorine, such as from greater than or equal to about 0.30 weight % fluorine to less than or equal to about 0.40 weight % fluorine.

In embodiments, the inner cladding has a minimum relative refractive index $\Delta_{2MIN}$ that is less than the relative refractive index of pure silica glass. For example, the inner cladding may have a minimum relative reflective index $\Delta_{2MIN}$ of less than or equal to about −0.040%, such as less than or equal to about −0.050%. The inner cladding may have a minimum relative reflective index $\Delta_{2MIN}$ of less than or equal to about −0.100%, such as less than or equal to about −0.125%. The inner cladding may have a minimum relative refractive index $\Delta_{2MIN}$ greater than or equal to about −0.210%, such as greater than or equal to about −0.200%. The inner cladding may have a minimum relative refractive index $\Delta_{2MIN}$ greater than or equal to about −0.175%, such as greater than or equal to about −0.150%. Accordingly, in embodiments, the inner cladding may have a minimum relative refractive index $\Delta_{2MIN}$ from less than or equal to about −0.040% to greater than or equal to about −0.210%, such as from less than or equal to about −0.050% to greater than or equal to about −0.200%. The inner cladding may have a minimum relative refractive index $\Delta_{2MIN}$ from less than or equal to about −0.100% to greater than or equal to about −0.175%, such as from less than or equal to about −0.125% to greater than or equal to about −0.150%.

Doping the core 102 with an up dopant and doping the inner cladding 104 with a down dopant provides a relationship between the maximum relative refractive index of the core $\Delta_{1MAX}$ and the minimum relative reflective index of the inner cladding $\Delta_{2MIN}$ where $\Delta_{1MAX} > \Delta_{2MIN}$. Further, the concentration of up dopants in the core 102 and the concentration of down dopants in the inner cladding 104 may be used to match the viscosity at the core/inner cladding boundary. Matching the viscosity of the core 102 and the viscosity of the inner cladding 104 reduces interfacial fluctuations at the boundary of the core 102 with the cladding 104, which cause small angle scattering of light within the optical fiber, further increasing attenuation of light traveling within the core 102 of the optical fiber 100. The viscosities of the core and the cladding in conventional fibers are generally not matched. The mismatch of these viscosities in conventional fibers leads to displacement of the core to the inner cladding at a given temperature, such as temperatures between the softening points of the core and the inner cladding. The displacement causes interfacial fluctuations that become permanent when the glass is cooled and, thereby, increases attenuation.

The matching of viscosity of the core 102 and the viscosity of the inner cladding 104 may be assessed by the difference between the softening point of the core 102 and the softening point of the inner cladding 104. As should be understood, the softening point of the core 102 and the inner cladding 104 is the temperature where the composition has a viscosity of $10^{7.6}$ poise. In embodiments, a difference between the softening point of the core and a softening point of the inner cladding may be less than or equal to about 15° C., such as less than or equal to about 12° C. A difference between the softening point of the core and a softening point of the inner cladding may be less than or equal to about 10° C., such as less than or equal to about 8° C.

As described herein above, and shown in FIGS. 1A and 1B, the optical fiber 100 may comprise an outer cladding 106. The outer cladding 106 has a radial thickness $T_3 = r_3 − r_2$. In embodiments, the radial thickness $T_3$ of the outer cladding 106 may be less than or equal to about 47.5 microns, such as less than or equal to about 34.5 microns. In other embodiments, the radial thickness $T_3$ of the outer cladding 106 may be less than or equal to about 29.5 microns, such as less than or equal to about 24.5 microns. In some embodiments, the outer cladding 106 is optional.

In embodiments, the outer cladding 106 comprises pure silica glass or SiON. Therefore, the maximum relative refractive index $\Delta_{3MAX}$ of the outer cladding is about 0.0% because, as stated herein, the relative refractive index is based on the refractive index of pure silica glass. Additionally, the outer cladding 106 will be stiff compared to the core 102 and the inner cladding 104, because it is not doped. Although not being bound to any particular theory, the outer cladding 106 contributes to reducing attenuation by reducing thermal stresses caused by mismatched CTE in the core 102 and the inner cladding 104. A mismatched CTE in the core 102 and the inner cladding can cause one of the core 102 or the cladding 104 to expand or contract more than the other, thereby causing stresses in core 102 and/or inner cladding 104 that can result in fluctuations that increase attenuation. However, when the outer cladding is stiffer than the core 102 and the inner cladding 104, it will expand or contract less than the core 102 or the inner cladding 104. Thereby, the stresses caused by mismatched CTE between the core 102 and the cladding 104 are transferred to the outer cladding 106, and fluctuations are reduced in the core 102 and the inner cladding 104. Accordingly, in some embodiments, the outer cladding 106 is positioned so that it does not interfere with the light that travels through the optical fiber 100.

As described herein above, according to embodiments, the relative refractive indexes of the core 102, the inner cladding 104, and the outer cladding 106 satisfy the following relationship: $\Delta_{1MAX} > \Delta_{3MAX} > \Delta_{2MIN}$.

Embodiments of the optical fiber disclosed herein have reduced attenuation. For example, the optical fiber may have an attenuation of less than or equal to about 0.19 dB/km at a wavelength of 1550 nm. In some embodiments, the optical fiber may have an attenuation of less than or equal to about 0.18 dB/km at a wavelength of 1550 nm, such as less than or equal to about 0.175 dB/km at a wavelength of 1550 nm. The optical fiber may have an attenuation of less than or equal to about 0.17 dB/km at a wavelength of 1550 nm, such as less than or equal to about 0.165 dB/km at a wavelength of 1550 nm. Additionally, the optical fiber may have an attenuation of less than or equal to about 0.32 dB/km at a wavelength of 1310 nm, such as less than or equal to about 0.31 dB/km at a wavelength of 1310 nm. The fiber designs disclosed herein result in fibers having optical properties that are G.652 compliant (ITU-T standards), MFD from greater than or equal to about 8.2 to less than or equal to about 9.5 microns at 1310 nm, such as from greater than or equal to about 9.0 to less than or equal to about 9.4 microns at 1310 nm, zero dispersion wavelength, $\lambda_0$, of $1300 \leq \lambda_0 \leq 1324$ nm, and cable cutoff less than or equal to about 1260 nm. Additional fiber designs disclosed herein result in fibers having optical properties that are G.654 compliant (ITU-T standards), and for example may exhibit a cable cutoff less than 1530 nm, such as less than 1500 nm. The G.654 applications the fibers may be configured to have dispersion at 1550 nm, which is less than or equal to 22 ps/nm/km.

In embodiments, the optical fiber may be a large effective area optical fiber. For example, the optical fiber may have an effective area greater than or equal to about 70 microns$^2$ at a wavelength of 1550 nm, such as greater than or equal to about 80 microns$^2$ at a wavelength of 1550 nm. The optical fiber may have an effective area greater than or equal to about 90 microns$^2$ at a wavelength of 1550 nm, such as greater than or equal to about 100 microns$^2$ at a wavelength of 1550 nm. The optical fiber may have an effective area less than or equal to about 145 microns$^2$ at a wavelength of 1550 nm, such as less than or equal to about 135 microns$^2$ at a wavelength of 1550 nm. The optical fiber may have an effective area less than or equal to about 125 microns$^2$ at a wavelength of 1550 nm, such as less than or equal to about 155 microns$^2$ at a wavelength of 1550 nm. Accordingly, in embodiments, the optical fiber may have an effective area of from greater than or equal to about 70 microns$^2$ to less than or equal to about 145 microns$^2$, such as from greater than or equal to about 80 microns$^2$ to less than or equal to about 135 microns$^2$. The optical fiber may have an effective area of from greater than or equal to about 90 microns$^2$ to less than or equal to about 125 microns$^2$, such as from greater than or equal to about 100 microns$^2$ to less than or equal to about 115 microns$^2$.

In embodiments, the core 102, inner cladding 104, and outer cladding 106 of the optical fiber 100 may be formed by an outside-vapor-deposition (OVD) process. The OVD process is a way of making optical fiber through reactions from the desired vapor ingredients (including silica and the other desired up dopant precursors) via a hydrolysis process in a $CH_4+O_2$ flame to form soot-particles (such as in the range of about 2 nm to 5 microns in diameter, and in some embodiments in the range of about 50 to 500 nm in diameter). The soot-particles are then collected by thermopheretic means onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. For example, the core/inner cladding/outer cladding preform may be generated first, then consolidated, and the final (consolidated) preform drawn into the optical fiber 100 by known fiber-drawing methods.

More specifically, vapor-precursor-materials that may be used to make the portion of the soot preform associated with the fiber core are, in embodiments, $SiCl_4$, $GeCl_4$, $AlCl_3$, $TiCl_4$, or $POCl_3$. As described in embodiments herein, the core may comprise $GeO_2$ doped silica glass. This soot preform is placed into a furnace, dried (e.g., in an atmosphere comprising chlorine gas) and then the up-doped $SiO_2$ soot is consolidated into a core preform (also referred to herein as a core glass preform or void-free glass core preform). The consolidated core preform is then optionally placed and heated in an air-, nitrogen-, or argon-purged furnace at about 800-1200° C. to outgas helium dissolved in the glass, and then optionally placed into another furnace and redrawn into one or multiple canes (also referred to as core canes). Soot of pure $SiO_2$ is deposited on the core preform to form a soot preform having a solid glass core cane. This soot/cane assembly is then placed in a furnace, dried, and then doped with fluorine (e.g., in an atmosphere comprising $SiF_4$). The assembly is thereafter consolidated to fully densified glass. The consolidated preform is then optionally placed and heated in an air-, nitrogen-, or argon-purged furnace at about 800-1200° C. to outgas the helium dissolved in the glass, and then optionally placed into another furnace and redrawn into one or multiple canes having a $GeO_2$ doped core surrounded by an F-doped silica cladding. The processes of depositing additional soot onto the consolidated preform, drying, doping, and sintering to fully densified glass may be repeated. In embodiments, the preform comprises silica with a $GeO_2$ doped core/F-doped inner clad and an F-doped, undoped $SiO_2$, or SiON doped outer cladding. The consolidated preform is then optionally placed and heated in an air-, nitrogen-, or argon-purged furnace at about 800-1200° C. to outgas helium dissolved in the glass. Optical fiber is then drawn from the preform and coated with standard primary and secondary urethane acrylate coatings.

Figure 2:
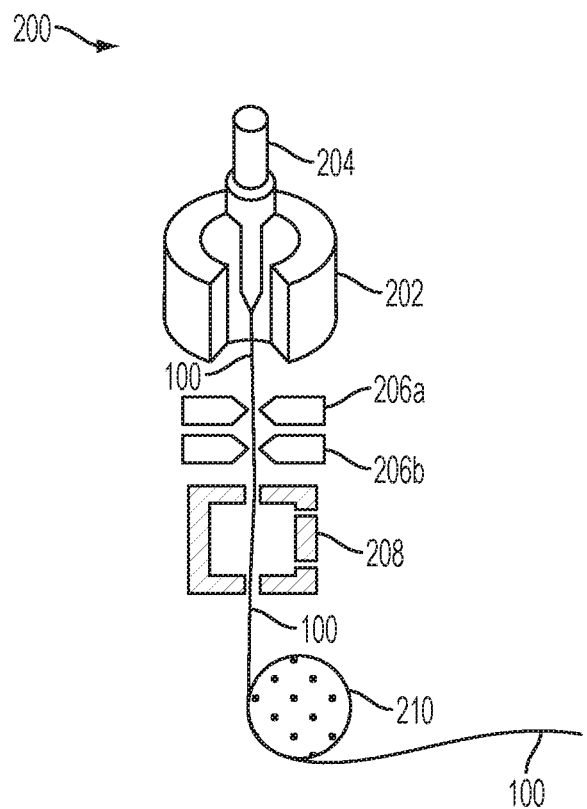
FIG. 2 is a schematic of a system for drawing an optical fiber according to one or more embodiments shown and described herein.

Referring now to FIG. 2, one embodiment of a system 200 for producing an optical fiber is illustrated. The system 200 may comprise a draw furnace 202 for heating an optical fiber preform 204 such that an optical fiber 100 may be drawn from the optical fiber preform 204. The preform 204 may be produced by the OVD method and have the composition and structure as set forth above. The draw furnace 202 may be oriented such that an optical fiber 100 drawn from the optical fiber preform 204 exits the furnace along a substantially vertical pathway.

After the optical fiber 100 exits the draw furnace 202, the diameter of the optical fiber 100 and the draw tension applied to the optical fiber 100 may be measured using non-contact sensors 206a, 206b. Tension may be applied to the optical fiber by any suitable tension-applying mechanism 210. As shown in FIG. 2, after the diameter and tension of the optical fiber 100 are measured, the optical fiber 100 may be passed through a cooling mechanism 208 which provides slow cooling of the optical fiber 100. The cooling mechanism 208 may be any mechanism for cooling an optical fiber as may be presently known in the art or subsequently developed. In one embodiment, the cooling mechanism 208 is filled with a gas that facilitates cooling of the optical fiber 100 at a rate slower than cooling the optical fiber 100 in air at ambient temperatures. As discussed above, optical fibers of embodiments include lower concentrations of up dopants, such as $GeO_2$, which means that the glass has a higher concentration of silica. Pure silica glass is stiffer than silica glass comprising up dopants, and the higher the concentration of up dopants, the lower the stiffness of the silica-based glass. Accordingly, cores according to embodiments, which have a lower concentration of up dopants than cores of conventional optical fibers, are stiffer than cores in conventional optical fibers. This increased stiffness results in stresses as the optical fiber is cooled because the optical fiber does not sufficiently contract to absorb the stresses. The faster the optical fiber is cooled, the more stresses are introduced into the optical fiber because the optical fiber cannot contract fast enough. These stresses result in fluctuations that increase attenuation. Accordingly, according to embodiments, the optical fiber may be cooled slowly to allow the stresses to relax and, thereby, reduce fluctuations and attenuation in the optical fiber.

In embodiments, the cooling mechanism 208 may cool the drawn optical fiber from a temperature of about 1600° C. to a temperature of about 1250° C. at a cooling rate of less than or equal to about 5000° C./s, such as less than or equal to about 4750° C./s. In some embodiments, the cooling mechanism 208 may cool the drawn optical fiber from a temperature of about 1600° C. to a temperature of about 1250° C. at a cooling rate of less than or equal to about 4500° C./s, such as less than or equal to about 4250° C./s. In some embodiments, the cooling mechanism 208 may cool the drawn optical fiber from a temperature of about 1250° C. to a temperature of about 1050° C. at a cooling rate of less than or equal to about 12000° C./s, such as less than or equal to about 11500° C./s. The cooling mechanism 208 may cool the drawn optical fiber from a temperature of about 1250° C. to a temperature of about 1050° C. at a cooling rate of less than or equal to about 11000° C./s, such as less than or equal to about 10500° C./s. In some embodiments the cooling mechanism 208 cools the drawn optical fiber from a temperature of about 1400° C. to a temperature of about 1050° C. at a cooling rate of less than or equal to about 4500° C./s, such as less than or equal to about 4250° C./s. In some embodiments, the cooling mechanism 208 may cool the drawn optical fiber from a temperature of about 1050° C. to a temperature of about 850° C. at a cooling rate of less than or equal to about 12000° C./s, such as less than or equal to about 11500° C./s. The cooling mechanism 208 may cool the drawn optical fiber from a temperature of about 1050° C. to a temperature of about 850° C. at a cooling rate of less than or equal to about 11000° C./s, such as less than or equal to about 10500° C./s.

In embodiments, the tension-applying mechanism 210 may apply a tension to the optical fiber 100 of less than or equal to about 100 $g_f$ ($g_f$ refers to grams force, herein) such as less than or equal to about 95 $g_f$. The tension-applying mechanism 208 may apply a tension to the optical fiber 100 of less than or equal to about 90 $g_f$, such as less than or equal to about 85 $g_f$. By minimizing the tension of the optical fiber 100, mechanical stresses formed in the optical fiber are reduced.

EXAMPLE

Embodiments will be further clarified by the following example.

Five fibers, Samples 1-5, are formed comprising a germania-doped core having a $\Delta_{1MAX}$ of 0.256%. The five fibers have a fluorine-doped inner cladding having a $\Delta_{2MIN}$ -0.094%. The fibers of Samples 2-5 have a pure silica glass outer cladding. The fibers are drawn at a tension of 100 $g_f$.

Figure 3:
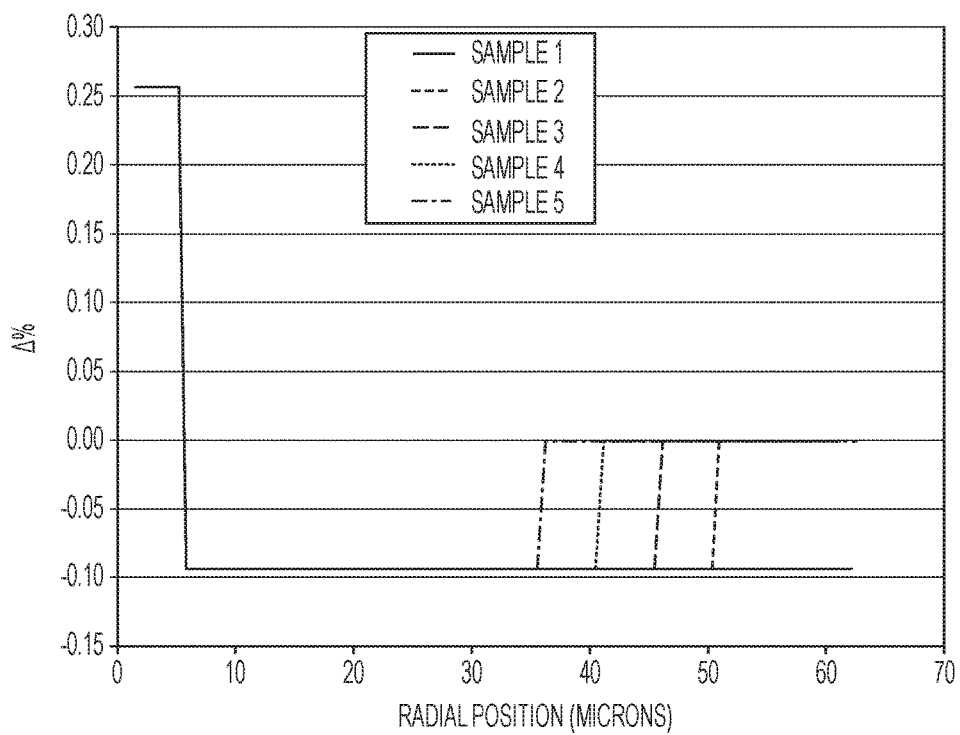
FIG. 3 graphically depicts Δ % versus radius of optical fibers according to one or more embodiments shown and described herein.

FIG. 3 graphically depicts Δ % versus radial position for fibers of Samples 1-5. As shown in FIG. 3, the fiber of Sample 1 has a silica core doped with $GeO_2$ to a radius of about 5 microns and a silica inner cladding doped with F from a radius of about 5 microns to a radius of about 62.5 microns; the fiber of Sample 2 has a silica core doped with $GeO_2$ to a radius of about 5 microns, a silica inner cladding doped with F from a radius of about 5 microns to a radius of 50 microns, and an outer cladding of pure silica glass from a radius of 50 microns to a radius of 62.5 microns; the fiber of Sample 3 has a silica core doped with $GeO_2$ to a radius of about 5 microns, a silica inner cladding doped with F from a radius of about 5 microns to a radius of 45 microns, and an outer cladding of pure silica glass from a radius of 45 microns to a radius of 62.5 microns; the fiber of Sample 4 has a silica core doped with $GeO_2$ to a radius of about 5 microns, a silica inner cladding doped with F from a radius of about 5 microns to a radius of 40 microns, and an outer cladding of pure silica glass from a radius of 40 microns to a radius of 62.5 microns; and the fiber of Sample 5 has a silica core doped with $GeO_2$ to a radius of about 5 microns, a silica inner cladding doped with F from a radius of about 5 microns to a radius of 35 microns, and an outer cladding of pure silica glass from a radius of 35 microns to a radius of 62.5 microns.

Figure 4:
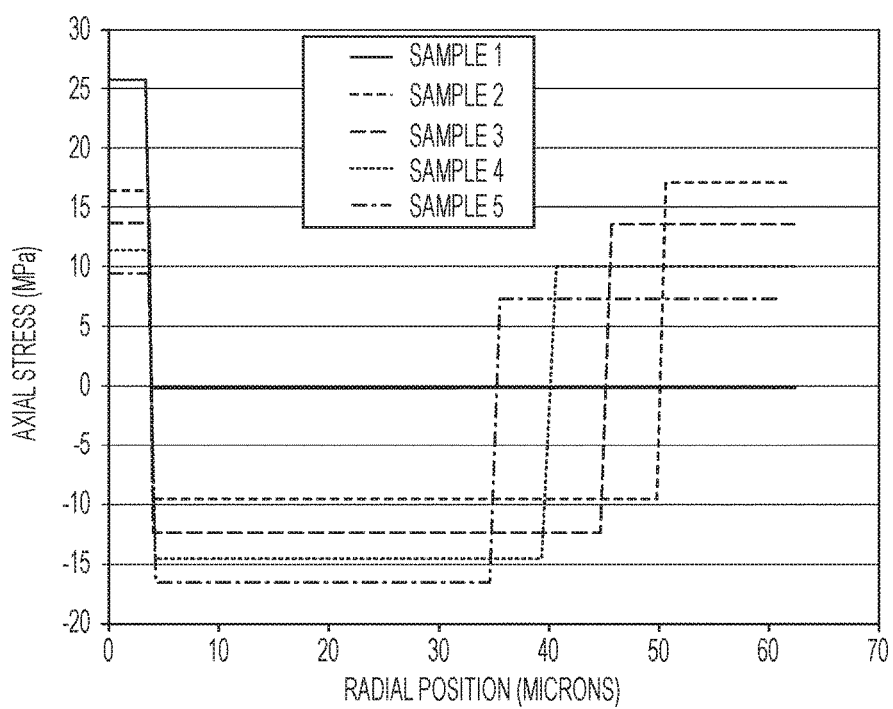
FIG. 4 graphically depicts axial stress versus radius of optical fibers according to one or more embodiments shown and described herein.

FIG. 4 graphically depicts axial stress versus radial position for fibers of Samples 1-5. As shown in FIG. 4, the fiber of Sample 1 has an axial stress of about 26 MPa in its core; the fiber of Sample 2 has an axial stress of about 17 MPa in its core; the fiber of Sample 3 has an axial stress of about 14 MPa in its core; the fiber of Sample 4 has an axial stress of about 12 MPa in its core; and the fiber of Sample 5 has an axial stress of about 10 MPa in its core. Thus, the Example shows that including an outer cladding that surrounds the inner cladding reduces the axial stress on the core of the optical fiber. Further, the closer radially the outer cladding is to the core, the lower the axial stress in the core. However, as disclosed above, the outer cladding may be positioned far enough away from the core so as not to interfere with the light traveling through the optical fiber.

Table 1 shows examples of optical fibers comprising $GeO_2$-doped silica core, fluorine (F)-doped silica inner cladding, and F-doped or undoped silica outer cladding. Table 1 shows the core index, $\Delta_{1MAX}$ in % (relative to pure silica having an index of 0.00% delta), the core dopant, the inner clad index $\Delta_{2min}$ in %, the inner clad dopant, the absolute difference between the core and inner clad index in %, the core softening point (the softening point is defined as the temperature of the glass having a Log 10(viscosity)=7.6), the inner clad softening point, the absolute difference in the core softening point and the inner clad softening point, the weight % $GeO_2$ dopant in the core [$GeO_{2(core)}$], the weight % fluorine dopant in the inner clad [$F_{(iclad)}$] and the ratio (in weight %/weight %) of $GeO_2$ dopant in the core to fluorine dopant in the inner clad [$GeO_{2(core)}/F_{(iclad)}$] for Examples 1-37.

TABLE 1

| Example | Core index (Δ1max), % | Core dopant | Inner clad index (Δ2min), % | Inner clad dopant | \|Δ1max − Δ2min\|, % | Core Softening Point, °C. | Inner Clad Softening Point, °C. | Difference in Softening Point (Core − Inner clad), °C. | GeO2(core), wt. % | F(iclad), wt. % | GeO2(core)/ F(clad), wt. %/wt. % |
|---|---|---|---|---|---|---|---|---|---|---|---|
| Ex 1  | 0.09 | GeO₂ | −0.11 | F | 0.20 | 1666 | 1648 | 18  | 1.55 | 0.37 | 4.2   |
| Ex 2  | 0.11 | GeO₂ | −0.09 | F | 0.20 | 1664 | 1652 | 12  | 1.91 | 0.30 | 6.3   |
| Ex 3  | 0.13 | GeO₂ | −0.07 | F | 0.20 | 1662 | 1656 | 6   | 2.27 | 0.24 | 9.5   |
| Ex 4  | 0.15 | GeO₂ | −0.05 | F | 0.20 | 1661 | 1661 | 0   | 2.63 | 0.17 | 15.2  |
| Ex 5  | 0.17 | GeO₂ | −0.03 | F | 0.20 | 1659 | 1665 | −6  | 2.99 | 0.11 | 27.4  |
| Ex 6  | 0.12 | GeO₂ | −0.13 | F | 0.25 | 1663 | 1645 | 18  | 2.21 | 0.41 | 5.4   |
| Ex 7  | 0.14 | GeO₂ | −0.11 | F | 0.25 | 1661 | 1649 | 12  | 2.57 | 0.35 | 7.4   |
| Ex 8  | 0.16 | GeO₂ | −0.09 | F | 0.25 | 1659 | 1653 | 6   | 2.93 | 0.28 | 10.4  |
| Ex 9  | 0.18 | GeO₂ | −0.07 | F | 0.25 | 1658 | 1658 | 0   | 3.29 | 0.22 | 15.2  |
| Ex 10 | 0.20 | GeO₂ | −0.05 | F | 0.25 | 1656 | 1662 | −6  | 3.65 | 0.15 | 23.9  |
| Ex 11 | 0.22 | GeO₂ | −0.03 | F | 0.25 | 1655 | 1667 | −12 | 4.01 | 0.09 | 45.6  |
| Ex 12 | 0.24 | GeO₂ | −0.01 | F | 0.25 | 1653 | 1671 | −18 | 4.37 | 0.02 | 186.8 |
| Ex 13 | 0.16 | GeO₂ | −0.14 | F | 0.30 | 1660 | 1642 | 18  | 2.87 | 0.45 | 6.3   |
| Ex 14 | 0.18 | GeO₂ | −0.12 | F | 0.30 | 1658 | 1646 | 12  | 3.23 | 0.39 | 8.3   |
| Ex 15 | 0.20 | GeO₂ | −0.10 | F | 0.30 | 1656 | 1650 | 6   | 3.59 | 0.32 | 11.0  |
| Ex 16 | 0.22 | GeO₂ | −0.08 | F | 0.30 | 1655 | 1655 | 0   | 3.95 | 0.26 | 15.2  |
| Ex 17 | 0.24 | GeO₂ | −0.06 | F | 0.30 | 1653 | 1659 | −6  | 4.31 | 0.20 | 22.0  |
| Ex 18 | 0.26 | GeO₂ | −0.04 | F | 0.30 | 1652 | 1664 | −12 | 4.67 | 0.13 | 35.6  |
| Ex 19 | 0.28 | GeO₂ | −0.02 | F | 0.30 | 1650 | 1668 | −18 | 5.03 | 0.07 | 75.3  |
| Ex 20 | 0.20 | GeO₂ | −0.15 | F | 0.35 | 1657 | 1639 | 18  | 3.53 | 0.50 | 7.1   |
| Ex 21 | 0.22 | GeO₂ | −0.13 | F | 0.35 | 1655 | 1643 | 12  | 3.89 | 0.43 | 9.0   |
| Ex 22 | 0.24 | GeO₂ | −0.11 | F | 0.35 | 1654 | 1648 | 6   | 4.25 | 0.37 | 11.5  |
| Ex 23 | 0.26 | GeO₂ | −0.09 | F | 0.35 | 1652 | 1652 | 0   | 4.61 | 0.30 | 15.2  |
| Ex 24 | 0.28 | GeO₂ | −0.07 | F | 0.35 | 1650 | 1656 | −6  | 4.97 | 0.24 | 20.8  |
| Ex 25 | 0.30 | GeO₂ | −0.05 | F | 0.35 | 1649 | 1661 | −12 | 5.33 | 0.17 | 30.5  |
| Ex 26 | 0.32 | GeO₂ | −0.03 | F | 0.35 | 1647 | 1665 | −18 | 5.69 | 0.11 | 51.6  |
| Ex 27 | 0.23 | GeO₂ | −0.17 | F | 0.40 | 1654 | 1636 | 18  | 4.18 | 0.54 | 7.7   |
| Ex 28 | 0.25 | GeO₂ | −0.15 | F | 0.40 | 1652 | 1640 | 12  | 4.54 | 0.48 | 9.5   |
| Ex 29 | 0.27 | GeO₂ | −0.13 | F | 0.40 | 1651 | 1645 | 6   | 4.90 | 0.41 | 11.9  |

TABLE 1-continued

| Example | Core index ($\Delta1max$), % | Core dopant | Inner clad index ($\Delta2min$), % | Inner clad dopant | $|\Delta1max - \Delta2min|$, % | Core Softening Point, °C. | Inner Clad Softening Point, °C. | Difference in Softening Point (Core − Inner clad), °C. | GeO2(core), wt. % | F(iclad), wt. % | GeO2(core)/ F(clad), wt. %/wt. % |
|---|---|---|---|---|---|---|---|---|---|---|---|
| Ex 30 | 0.29 | GeO$_2$ | −0.11 | F | 0.40 | 1649 | 1649 | 0 | 5.26 | 0.35 | 15.2 |
| Ex 31 | 0.31 | GeO$_2$ | −0.09 | F | 0.40 | 1647 | 1653 | −6 | 5.62 | 0.28 | 19.9 |
| Ex 32 | 0.33 | GeO$_2$ | −0.07 | F | 0.40 | 1646 | 1658 | −12 | 5.98 | 0.22 | 27.4 |
| Ex 33 | 0.35 | GeO$_2$ | −0.05 | F | 0.40 | 1644 | 1662 | −18 | 6.34 | 0.15 | 41.3 |
| Ex 34 | 0.27 | GeO$_2$ | −0.18 | F | 0.45 | 1651 | 1633 | 18 | 4.84 | 0.58 | 8.3 |
| Ex 35 | 0.30 | GeO$_2$ | −0.15 | F | 0.45 | 1649 | 1640 | 9 | 5.38 | 0.49 | 11.0 |
| Ex 36 | 0.33 | GeO$_2$ | −0.12 | F | 0.45 | 1646 | 1646 | 0 | 5.92 | 0.39 | 15.2 |
| Ex 37 | 0.36 | GeO$_2$ | −0.09 | F | 0.45 | 1644 | 1653 | −9 | 6.46 | 0.29 | 22.0 |

The optical fibers in Table 1 have GeO$_2$-doped silica cores, fluorine-doped inner cladding, and fluorine-doped or undoped silica outer cladding. The fibers in the Table are shown to have $0.09 \leq \Delta_{1max} \leq 0.36$, and $-0.18 \leq \Delta_{2min} \leq -0.01$. The fibers in the Table are shown to have $0.20 \leq |\Delta_{1max} - \Delta_{2min}| \leq 0.45$. The fibers in the Table are shown to have an absolute difference in the core softening point and the inner clad softening point of $\leq 20°$ C., in some examples $\leq 15°$ C., and in some examples $\leq 10°$ C. The fibers in the Table are shown to have a weight % of GeO$_2$ dopant in the core of $\leq 6.5\%$. The fibers in the Table are shown to have 1.5 wt. % $\leq$ GeO$_{2(core)} \leq 6.5$ wt. %. The fibers in the Table are shown to have $\geq 0.02$ wt. % fluorine dopant in the inner clad. The fibers in the Table are shown to have 0.02 wt. % $\leq F_{(iclad)} \leq 0.6$ wt. %. The fibers in the Table are shown to have a ratio of GeO$_2$ dopant in the core to fluorine dopant in the inner clad (in weight %/weight %) of $4 < [\text{GeO}_{2(core)}/F_{(iclad)}] < 190$, in some embodiments $6 < [\text{GeO}_{2(core)}/F_{(iclad)}] < 50$, in some embodiments $6 < [\text{GeO}_{2(core)}/F_{(iclad)}] < 35$ Table 2 shows the core, inner cladding and outer cladding indexes (relative to pure silica having an index of 0.00% delta), the core outer radius, alpha and dopant, the inner clad outer radius and dopant, and the outer clad radius and dopant of exemplary fibers according to embodiments disclosed herein. Also shown are the optical properties for these fibers including the zero dispersion wavelength (lambda 0), the 1310 and 1550 nm dispersion, dispersion slope, and mode field diameter, theoretical and 22 meter cable cutoff, 1550 nm effective area, lateral load and pin array and attenuation at 1550 nm ("na" equals not applicable). In Table 2: Example 38 corresponds to Example 4; Examples 39 and 40 correspond to Example 9; Example 41 corresponds to Example 16; Examples 42 and 43 correspond to Example 23; Example 44 corresponds to Example 30; and Example 45 corresponds to Example 36.

TABLE 2

|  | Ex. 38 | Ex. 39 | Ex. 40 | Ex. 41 | Ex. 42 | Ex. 43 | Ex. 44 | Ex. 45 |
|---|---|---|---|---|---|---|---|---|
| Core delta, $\Delta_{1max}$, % | 0.15 | 0.18 | 0.18 | 0.22 | 0.26 | 0.26 | 0.29 | 0.33 |
| Core radius, R$_1$, microns | 6.60 | 6.14 | 6.14 | 5.41 | 4.36 | 4.36 | 4.16 | 3.96 |
| Core alpha | 20 | 20 | 20 | 20 | 20 | 20 | 20 | 20 |
| Core dopant | GeO$_2$ | GeO$_2$ | GeO$_2$ | GeO$_2$ | GeO$_2$ | GeO$_2$ | GeO$_2$ | GeO$_2$ |
| Inner clad delta, $\Delta_{2min}$, % | −0.05 | −0.07 | −0.07 | −0.08 | −0.09 | −0.09 | −0.11 | −0.12 |
| Inner clad radial thickness, microns | 15 | 15 | 50 | 15 | 15 | 55 | 15 | 15 |
| Inner clad dopant | F | F | F | F | F | F | F | F |
| Outer clad delta, $\Delta_3$, % | −0.05 | −0.07 | 0.00 | −0.08 | −0.09 | 0.00 | −0.11 | −0.12 |
| Outer clad radial thickness, microns | 62.5 | 62.5 | 62.5 | 62.5 | 62.5 | 62.5 | 62.5 | 62.5 |
| Outer clad dopant | F | F | none | F | F | none | F | F |
| Dispersion at 1310 nm, ps/nm/km | na | na | na | na | 0.80 | 0.80 | 0.74 | 0.54 |
| Dispersion slope at 1310 nm, ps/nm/km/nm | na | na | na | na | 0.085 | 0.085 | 0.085 | 0.084 |
| Lambda 0, nm | na | na | na | na | 1301 | 1301 | 1301 | 1304 |
| Dispersion at 1550 nm, ps/nm/km | 20.5 | 20.5 | 20.5 | 19.8 | 17.4 | 17.4 | 17.1 | 16.7 |
| Dispersion slope at 1550 nm, ps/nm/km/nm | 0.061 | 0.061 | 0.061 | 0.060 | 0.057 | 0.057 | 0.056 | 0.056 |
| Mode Field Diameter at 1310 nm, microns | na | na | na | na | 9.1 | 9.1 | 8.5 | 8.1 |
| Effective Area at 1550 nm, microns$^2$ | 156 | 129 | 129 | 104 | 80.7 | 80.7 | 73 | 63.9 |

TABLE 2-continued

|  | Ex. 38 | Ex. 39 | Ex. 40 | Ex. 41 | Ex. 42 | Ex. 43 | Ex. 44 | Ex. 45 |
|---|---|---|---|---|---|---|---|---|
| Mode Field Diameter at 1550 nm, microns | 14 | 12.7 | 12.7 | 11.5 | 10.2 | 10.2 | 9.7 | 9.1 |
| Pin Array at 1550 nm, dB | 55 | 14 | 14 | 5.1 | 5.5 | 5.5 | 1.5 | 0.4 |
| Theoretical Cutoff, nm | 1549 | 1611 | 1611 | 1556 | 1354 | 1354 | 1382 | 1396 |
| 22 m cable cutoff nm | 1299 | 1461 | 1461 | 1406 | 1204 | 1204 | 1232 | 1246 |
| Lateral Load at 1550 nm, dB | 7.5 | 1.6 | 1.6 | 0.51 | 0.19 | 0.19 | 0.11 | 0.08 |
| Attenuation at 1550 nm, dB/km | ≤0.18 | ≤0.18 | ≤0.18 | ≤0.18 | ≤0.19 | ≤0.18 | ≤0.19 | ≤0.19 |

The optical fibers in Table 2 have $GeO_2$-doped silica core and fluorine-doped inner cladding, and fluorine-doped or undoped silica outer cladding. The fibers in Table 2 are shown to have $0.15 \leq \Delta_{1max} \leq 0.33$, and $-0.12 < \Delta_{2min} \leq -0.05$. The fibers in Table 2 are shown to have $0.20 \leq |\Delta_{1max} - \Delta_{2min}| \leq 0.45$. The fibers in Table 2 are shown to have 1310 mode field diameters between about 8.1 and 9.4 microns² and Lambda 0 between 1300 and 1324 nm and cable cutoff of less than or equal to 1260 nm. The fibers in Table 2 are shown to have 1550 mode field diameters of between about 9 to 14 microns² and cable cutoff of less than 1500 nm. A number of examples of fibers in Table 2 are G.652 and G.654 compliant. The fibers in Table 2 are shown to have low attenuation of ≤0.19 dB/km.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
   a single mode optical fiber having a core comprising silica and an up dopant; and
   an inner cladding surrounding the core, wherein
   a difference between a softening point of the core and a softening point of the inner cladding is less than or equal to 50° C.,
   the core has a maximum relative refractive index, $\Delta_{1MAX}$, from greater than or equal to 0.13% to less than or equal to 0.37%, and
   the inner cladding has a minimum relative reflective index, $\Delta_{2MIN}$, from less than or equal to −0.04% to greater than or equal to −0.2%, and
   further comprising an outer cladding surrounding the inner cladding, wherein
   the outer cladding comprises SiON,
   the outer cladding has a maximum relative refractive index $\Delta_{3MAX}$, and
   $\Delta_{3MAX} > \Delta_{2MIN}$.

2. The optical fiber of claim 1 wherein the difference between the softening point of
   the core and the softening point of the inner cladding is less than or equal to 20° C.

3. The single mode optical fiber of claim 1, wherein the core comprises
   from greater than or equal to 2.0 weight % germania.

4. The single mode optical fiber of claim 1, wherein the inner
   cladding comprises from greater than or equal to 0.1 weight % fluorine to less than or equal to 0.65 weight % fluorine.

5. The single mode optical fiber of claim 1, wherein the difference between the softening point of the core and the softening point of the inner cladding is less than or equal to 10° C.

6. The single mode optical fiber of claim 1, wherein
   the core is doped with $GeO_2$,
   the inner cladding is doped with fluorine, and
   $6 < GeO_{2(core)}/fluorine_{(iclad)} < 35$, where $GeO_2$ and F are in weight %.

7. The single mode optical fiber of claim 1, wherein the core has a radial thickness from greater than or equal to 3 microns to less than or equal to 7 microns.

8. The single mode optical fiber of claim 1, wherein the inner cladding has a radial thickness from greater than or equal to 12 microns.

9. The single mode optical fiber of claim 1, wherein the inner cladding has a radial thickness from greater than or equal to about 12 microns to less than or equal to about 55 microns.

10. The single mode optical fiber of claim 1, wherein the single mode optical fiber has an attenuation of less than or equal to 0.18 dB/km at a wavelength of 1550 nm.

11. The single mode optical fiber of claim 1, wherein the single mode optical fiber has an effective area at 1550 nm of greater than or equal to 70 microns².

* * * * *